United States Patent
Wetzker et al.

(10) Patent No.: US 11,569,935 B2
(45) Date of Patent: Jan. 31, 2023

(54) CONCEPT FOR THE ANALYSIS OF A RADIO COMMUNICATION SYSTEM

(71) Applicant: FRAUNHOFER-GESELLSCHAFT ZUR FOERDERUNG DER ANGEWANDTEN FORSCHUNG E.V., Munich (DE)

(72) Inventors: Ulf Wetzker, Dresden (DE); Andreas Frotzscher, Dresden (DE); Priyanka Neuhaus, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 261 days.

(21) Appl. No.: 16/591,835

(22) Filed: Oct. 3, 2019

(65) Prior Publication Data
US 2020/0112386 A1   Apr. 9, 2020

(30) Foreign Application Priority Data
Oct. 4, 2018   (EP) ...................................... 18198688

(51) Int. Cl.
| H04L 1/00 | (2006.01) |
| H04L 5/00 | (2006.01) |
| H04L 27/144 | (2006.01) |
| H04W 24/10 | (2009.01) |
| H04W 88/06 | (2009.01) |

(52) U.S. Cl.
CPC ............ H04L 1/005 (2013.01); H04L 5/0048 (2013.01); H04L 27/144 (2013.01); H04W 24/10 (2013.01); H04W 88/06 (2013.01)

(58) Field of Classification Search
None
See application file for complete search history.

(56) References Cited

U.S. PATENT DOCUMENTS

| 7,155,167 | B1 | 12/2006 | Carty |
| 7,899,106 | B2 | 3/2011 | Camp, Jr. |
| 7,978,613 | B2 | 7/2011 | Gray et al. |

(Continued)

FOREIGN PATENT DOCUMENTS

| DE | 102004003755 A1 | 8/2005 | |
| EP | 2352236 A1 | 8/2011 | |
| WO | WO-2019101334 A1 * | 5/2019 | ........ H04W 36/0083 |

OTHER PUBLICATIONS

Dwivedi, Anuj Kumar, and Om Prakash Vyas. "An exploratory study of experimental tools for wireless sensor networks," Wireless Sensor Network 3.07 (2011): 215-240.

(Continued)

*Primary Examiner* — Chi H Pham
*Assistant Examiner* — Raul Rivas
(74) *Attorney, Agent, or Firm* — Perry + Currier (57) ABSTRACT

Described herein is the generation of a signal for an analysis of a communication network based on a first version of a radio signal transmitted from a first node of the radio communication system to a second node of the radio communication system received at a passive node by detecting deviations of the first version of the transmitted radio signal from a second version of the radio signal received at the second node, and generating the signal based on the deviations.

35 Claims, 5 Drawing Sheets

(56) References Cited

U.S. PATENT DOCUMENTS

| | | | | |
|---|---|---|---|---|
| 2004/0190549 A1* | 9/2004 | Huitema | ............... | H04L 69/167 |
| | | | | 370/466 |
| 2005/0265439 A1* | 12/2005 | Matsumura | ....... | H04L 25/03038 |
| | | | | 375/232 |
| 2011/0158093 A1* | 6/2011 | Hirasawa | ................ | H04L 47/32 |
| | | | | 370/230 |
| 2018/0103302 A1* | 4/2018 | Bell | ....................... | G06N 20/00 |
| 2019/0052227 A1* | 2/2019 | Troger | ................ | H04L 27/2675 |

OTHER PUBLICATIONS

Mahajan, Ratul, et al. "Analyzing the MAC-level behavior of wireless networks in the wild," ACM SIGCOMM Computer Communication Review. vol. 36, No. 4, ACM, 2006.

Cheng, Yu-Chung, et al. "Jigsaw: Solving the puzzle of enterprise 802.11 analysis", vol. 36, No. 4, ACM, 2006.

Fluke Networks, AirMagnet Spectrum XT Datasheet. 2011. Fluke Corporation. Retrieved from the Internet: http://enterprise-de.netscout.com/content/datasheet-airmagnet-spectrum-xt.

Fluke Networks, AirMagnet WiFi Analyzer Datasheet. 2010. Fluke Corporation. Retrieved from the Internet on Dec. 30, 2019. URL: http://enterprise-de.netscout.com/enterprise-network/wireless-network/AirMagnet-WiFi-Analyzer.

Wireshark Foundation, "Download," Wireshark • Go Deep., Dec. 18, 2019, https://www.wireshark.org/.

Tektronix, RSA7100A Spectrum Analyzer Datastheet. Jul. 16, 2019. Tektronix, Inc., Retrieved on the Internet: https://download.tek.com/datasheet/RSA7100A-Datasheet-37W609717.pdf.

* cited by examiner

CONCEPT FOR THE ANALYSIS OF A RADIO COMMUNICATION SYSTEM

CROSS-REFERENCE TO RELATED APPLICATIONS

This application claims priority from European Patent Application No. 18198688.6, which was filed on Oct. 4, 2018, and is incorporated herein in its entirety by reference.

The present application deals with concepts for the analysis of radio communication systems.

BACKGROUND OF THE INVENTION

Radio communication systems are omnipresent in many areas, e.g. in industrial automation for the data technical connection of mobile and movable subsystems to higher-level systems, in large public areas, such as railway stations, airports, exhibition halls, hospitals and above all in the daily life of private users. Many of the used radio systems use license-free frequency bands, such as the ISM (Industrial, Scientific and Medical Band) or UNIT (Unlicensed National Information Infrastructure) frequency bands.

However, data transmission via radio is influenced by various interference factors, for example by path losses, interference with other radio nodes or interfering transmitters, shadowing effects, fast and slow fading due to multipath propagation and movement of the transmitter, receiver or objects in the environment, and hardware or software defects in the transmitting or receiving node.

Temporal and spatial overlaps in the usage of a frequency band can result in significant negative effects on the radio links. This is particularly the case when the radio medium is not coordinated by a central instance. The spatial distribution of the network participants and possible interference sources intensifies this problem, since the signal emitted by a radio participant can only be received at a limited spatial distance. This characteristic leads to the known "hidden node problem" and the "exposed node problem". Depending on the position and other influencing variables such as the radiation characteristics of the antenna, transmission power or reflection and attenuation characteristics of the environment, situations arise in which the interferences within a network can vary greatly depending on the location.

Figure 1:
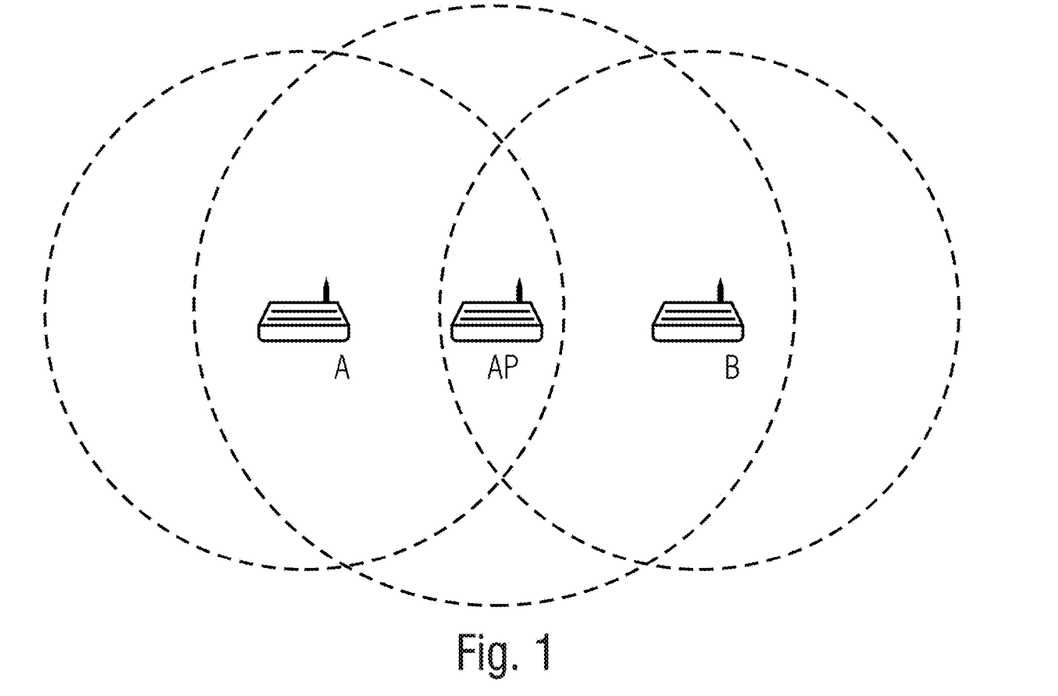
FIG. 1 is a schematic diagram for illustrating spatially dependent interference conditions within a radio network.

The example in FIG. 1 shows exemplarily in a schematic diagram how the position and transmission power of three radio nodes can cause different interference conditions in a network. The AP node is in the influence area of radio node A and radio node B. Radio node A and B are only in the influence area of the node AP, but not in the influence area of the other radio node.

In addition, the reception of an emitted packet is also influenced by apparatus-specific interference, which results in very individual error patterns of the individual nodes even in very dense radio networks.

The mobility of the network participants and of objects in their environment, such as persons and vehicles, cause, in combination with environmental influences, such as temperature changes and humidity variations, a strong temporal dependency of the connection quality of the individual radio links.

Due to this spatial, temporal and apparatus-specific dependency of the interferences, statements on the condition and reliability of radio networks cannot be made on the basis of the estimates performed during the planning phase. The multitude and dynamics of the influencing factors described above can lead to very large deviations between the network state predicted in the planning phase and the real state of the network in the life cycle.

Currently, radio components do not have sufficient capability for monitoring the state of radio networking, since their available hardware resources are very limited. In the case of transmission interferences, the radio components are not able to independently identify the cause of the transmission interferences and initiate a corrective response or inform the user.

External monitoring systems, which have the necessary hardware resources, are, as observers, not part of the link to be analyzed and should also not influence the same by active influence. The usage of external monitoring components causes differences in the reception and interference conditions with regard to the network to be monitored. These differences may complicate and falsify the results of the intended analyses, such as analyses of transmission quality, stability, reliability and availability of all radio links.

Figure 2:
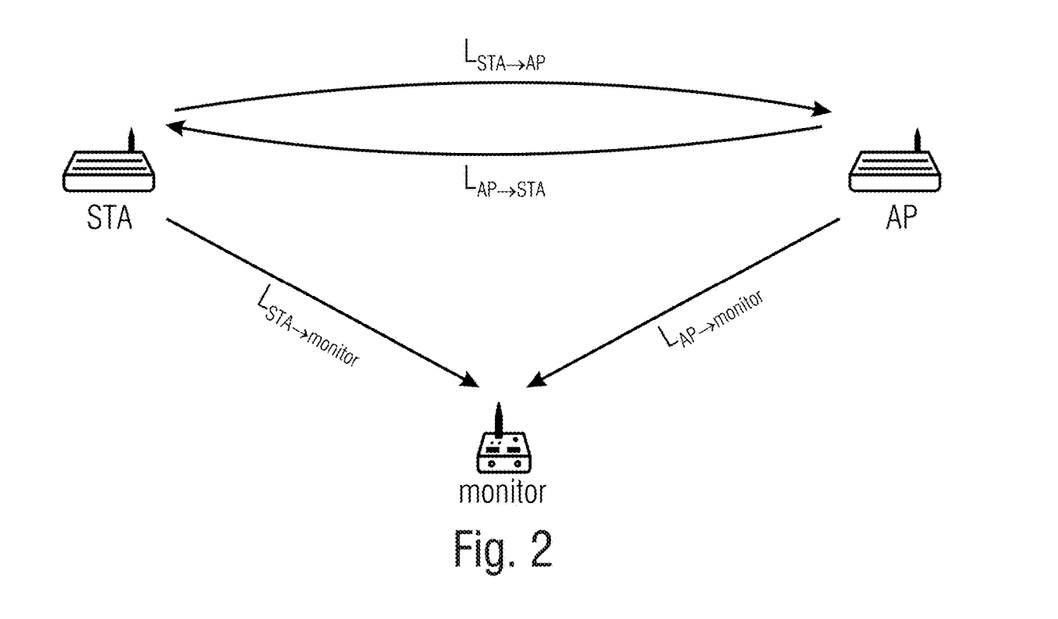
FIG. 2 is a schematic diagram for illustrating the links between two nodes of a radio communication network and a monitor for illustrating an external observation of a radio network.

The minimal example shown in FIG. 2 shows the communication between an access point AP and a station or node STA. Radio communication consists of two unidirectional links.

On the link $L_{AP \rightarrow STA}$, the AP sends radio packets which are received by the STA. The link $L_{STA \rightarrow AP}$ represents the opposite direction of communication where packets are emitted from STA and received by AP.

In this example, the monitoring system comprises a monitoring node or monitor. In a real application with several network participants, the monitoring system would usually comprise several monitoring nodes for improved area coverage.

The monitoring nodes receive radio signals from their environment and process them further. Processing can be divided into the following two types. On the one hand, a spectral analysis of the receive signal can be performed. On the other hand, the receive signal can be demodulated to extract digital information transmitted in the radio packets. The following designations are used below for a clear description. As a result of the spectral analysis, spectral information is available for each received radio packet. After successful demodulation of the receive signal, the contents of the received radio packets, the so-called "packet contents", are available. A combination of spectral analysis and demodulation is also possible.

A monitoring node can only monitor the radio packets emitted by the radio nodes AP and STA. These two unidirectional links are hereinafter referred to as $LSTA_{\rightarrow Monitor}$ and $LAP_{\rightarrow Monitor}$.

Due to the spatial, temporal and apparatus-specific reception differences between the radio nodes AP and STA and the monitoring node, the receive signals at AP, STA and monitoring node differ considerably from each other. This means that the reception situations can vary greatly.

The information extractable from the receive signal of the monitoring node, e.g. spectral information and packet contents, may differ significantly from that of the observed radio links $LAP_{\rightarrow STA}$ and $LSTA_{\rightarrow AP}$.

Figure 3:
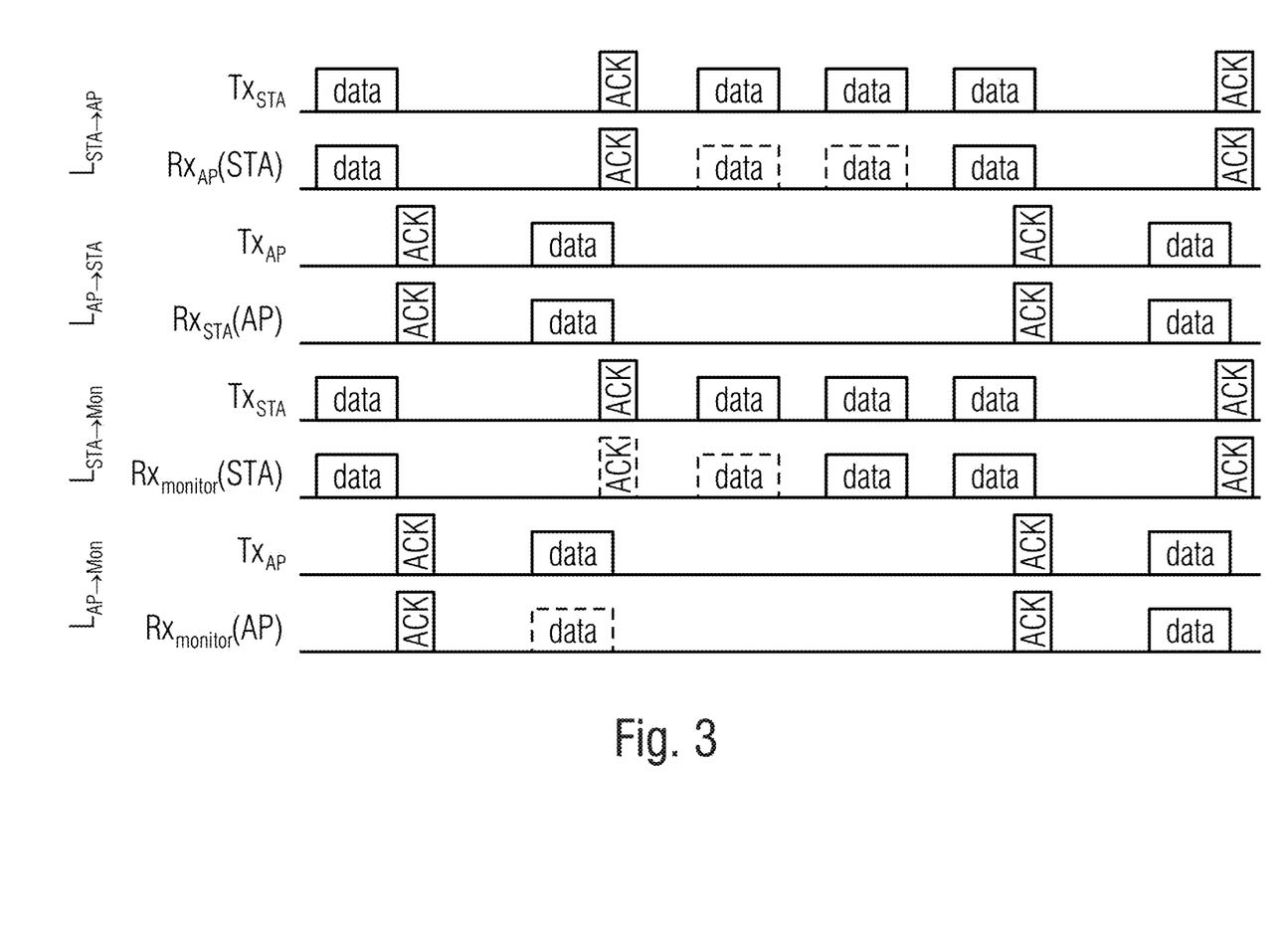
FIG. 3 is a schematic representation of transmitted and received packets in the individual connections or links in FIG. 2 using the example of a data packet transmission to explain a device-specific characteristic of receiving errors.

In FIG. 3, the individual links for the exemplary network of FIG. 2 are broken down according to the emitted and received radio packets. Radio packets that could not be demodulated correctly due to the various interference factors at the receiver are shown in a dashed manner. Some radio packets of the node AP or the node STA are not correctly received by the desired receiver, i.e. STA or AP, and rejected as defective, whereas the monitoring node receives these packets. Conversely, situations occur in which the actual receiver receives the packets correctly, but the monitoring node does not capture these radio packets.

The effect just described, which could also be described as an observation problem, leads to an incomplete database within the monitoring system and thus to a possible misinterpretation of the connection state of the observed radio link. Of course, an attempt is made to minimize this problem as much as possible, for example by selecting the position of the monitoring nodes according to the maximum signal-to-noise ratio with respect to the actual receiver, which is not possible at all times or can at least mean a large effort.

SUMMARY

According to an embodiment, an apparatus for generating a signal for an analysis of a radio communication system based on a first version of a radio signal transmitted from a first node of the radio communication system to a second node of the radio communication system received by a passive node may have: means for detecting deviations of the first version of the transmitted radio signal from a second version of the radio signal received by the second node; means for generating the signal based on the deviations.

According to another embodiment, a method for generating a signal for an analysis of a communication network based on a first version of a radio signal transmitted from a first node of the radio communications system to a second node of the radio communications system received at a passive node may have the steps of: detecting deviations of the first version of the transmitted radio signal from a second version of the radio signal received at the second node; generating the signal based on the deviations.

Another embodiment may have a non-transitory digital storage medium having a computer program stored thereon to perform the inventive method for generating a signal for an analysis of a communication network when said computer program is run by a computer.

A core idea of the present invention is the fact that it is possible to make an analysis of a radio communication system more effective when the version of a radio signal transmitted from a first node of the radio communication system received at the passive node is subjected to some sort of preprocessing in order to detect deviations of that version received at the passive node from a version received at a second node which is the actual receiver of the transmitted radio signal, and then to use the detected deviations for generating a signal for the analysis. For example, the signal can be generated to include an evaluation basis as a substitute for the second version for the purpose of evaluating communication between the first and second nodes. The detected deviations may then be used to modify the version received by the passive node on the basis of the deviations and/or to provide the version received by the passive node with additional information relating to the deviations in order to obtain the evaluation basis. The latter may serve as a substitute for the version of the radio signal received by the actual receiver to perform an evaluation of the communication from first to second node thereon, the evaluation basis differing less from the version received by the actual receiver than the version received by the passive node or, in other words, the evaluation basis, with respect to the version received by the passive node, generating fewer evaluation deviations with respect to an evaluation of the communication between the two radio communication system nodes based on the version actually received at the actual receiver of the radio signal than an evaluation of the communication directly based on the version received by the passive node.

Again, in other words, one finding of the present invention is that, despite a lack of access to the undisturbed version, i.e. the actually transmitted radio signal, and to the version as received by the actual receiving node of the radio communication system, it is possible to detect many deviations of the version received by the passive node from the version actually received by the actual receiving node. Although it may not be possible to perfectly reconstruct unreceived parts in the version received at the passive node, perfect reconstruction is also dispensable, as long as it is possible to reduce the extent to which the non-reception at the passive node influences a subsequent evaluation of the communication between the transmitting node and the receiving node of the radio communication system by modifying or providing additional information. Conversely, it is also possible to detect parts in the version received at the passive node which, conversely, have not actually been received at the actual receiver node of the radio communication system, so that by modification and/or provision with additional information the influence of such parts in the version received at the passive node on a subsequent evaluation of the communication between the transmitting node and the receiving node can be reduced. Corresponding considerations also apply to differences or deviations in the version received at the passive node with regard to the correctness of the reception as opposed to reception or non-reception. Further, the signal generated for an analysis of the communication network based on the detected deviations may include, in addition or alternatively, an evaluation of an observation position of the passive node. The latter evaluation provides a reliable basis for setting up passive nodes for the purpose of analyzing an existing radio communication system, whereby the signaled evaluation of an observation position may also contain indications to improve a negatively affected observation position.

BRIEF DESCRIPTION OF THE DRAWINGS

Embodiments of the present invention will be detailed subsequently referring to the appended drawings, in which.

DETAILED DESCRIPTION OF THE INVENTION

Figure 4:
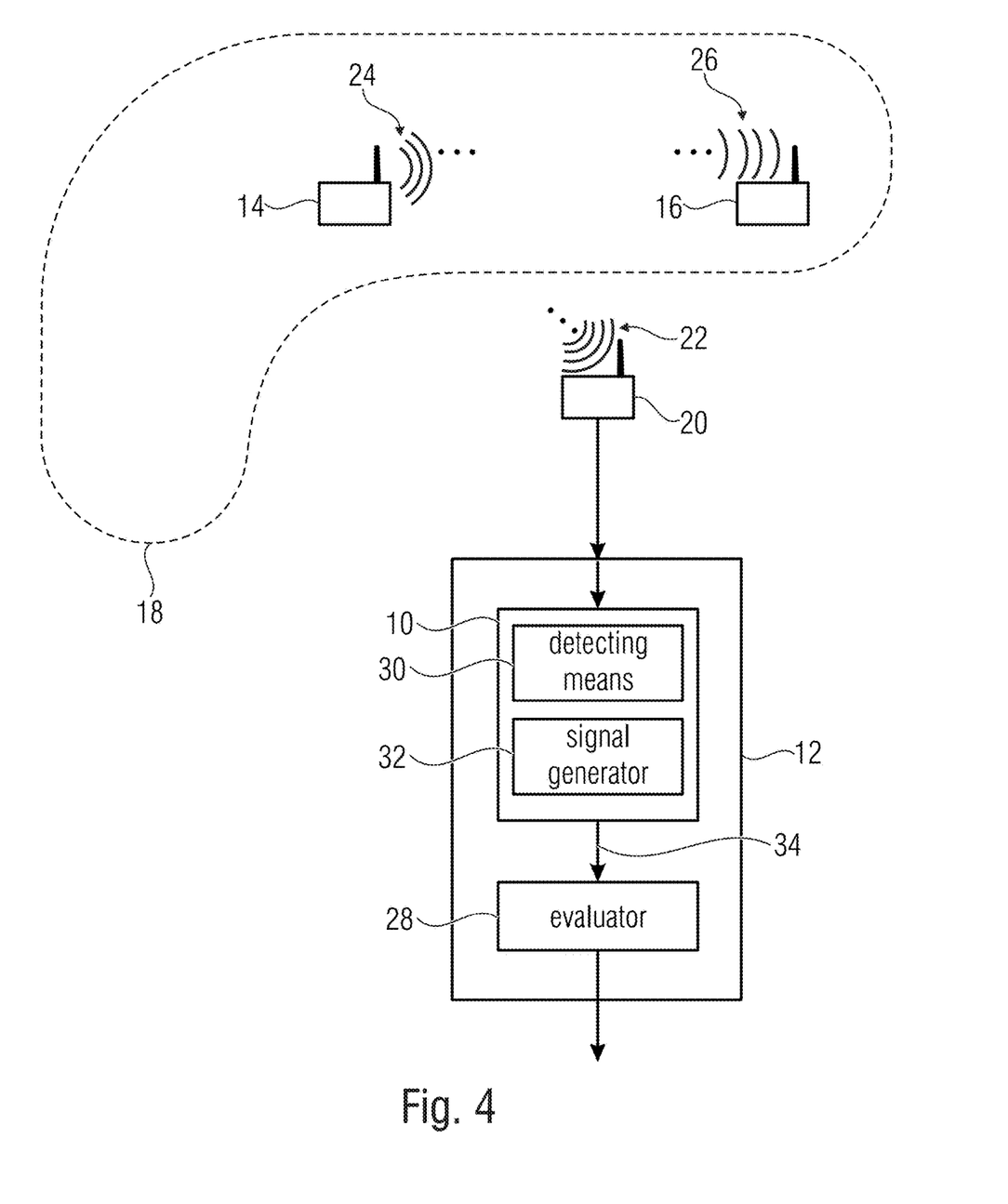
FIG. 4 is a schematic illustration for illustrating the links between two nodes of a radio communication network and a monitor comprising an apparatus for illustrating external observation and evaluation of a radio network.

FIG. 4 shows a section of a radio communication system, namely two nodes thereof, as an example of an environment in which embodiments of the present invention can be used advantageously. In particular, FIG. 4 shows an embodiment of an apparatus 10 for generating a signal for a radio communication system analysis based on an evaluation of the version of a radio signal received by a passive node from an actually received version of a receiver node of the radio communication system as well as an apparatus 12 for evaluating the communication between nodes of the radio communication system including or using this apparatus. This means, for example, as will be made clear below, that according to some embodiments, the apparatus 10 performs some sort of data preprocessing on the version of the radio signal received by the passive node which leads to rendering/improving the data which is then used in the communication evaluation within the apparatus 12.

FIG. 4 shows, in particular, a transmitting node 14 and a receiving node 16 of the radio communication system 18, which obviously points out that both nodes 14 and 16 are possibly transmitting/receiving nodes communicating bi-directionally with each other. In that regard, the designation of node 14 as a transmitting node and the designation of node 16 as a receiving node refer to the fact that the apparatus 12, as regards its mode of operation, which is described below, is configured to evaluate communication from node 14 to node 16, wherein it is noted, however, that the following description is obviously not restrictive and that the apparatus 12 could, of course, also evaluate communication from node 16 to node 14 in the same way as described below, as well as communication between other nodes and communication between other nodes, or to/from other nodes which the radio communication system 18 may also comprise.

FIG. 4 additionally shows a passive node 20. The latter node is positioned within a range of the transmitting node 14. The same "listens in" and receives a version 22 of the radio signal, which is actually addressed to the receiving node 16 by the transmitter 14. The version 22 received by the passive node 20 may differ from the actually transmitted version 24 of the radio signal due to reception losses and the like. In particular, the version 22 received at the passive node 20 may differ from the version 26 received by the actual addressee, namely node 16.

The evaluation apparatus 12 receives, via the passive node 20, the version 22 of the radio signal received by the latter in order to perform evaluation of the communication between nodes 14 and 16 or the communication from node 14 to node 16. Although FIG. 4 represents the case that the apparatus 12 is arranged externally to the passive node 20, it would of course also be possible that the apparatus 12 is integrated in the passive node 20. In addition, however, it would be possible that the apparatus 12 is coupled to more than one passive node 20, as will be pointed out below.

The evaluation apparatus 12 comprises, in particular, an evaluator or means 28 for performing the actual evaluation of the communication. However, as mentioned earlier, the version 22 received by passive node 20 may differ from the version 26 received by the actual addressee or node 16. In order to compensate for these deviations and to ensure that the result of the evaluation performed by means 28 is affected as little as possible by these deviations, the apparatus 10 performs preprocessing to obtain a signal containing an improved evaluation basis. The latter represents some sort of reconstruction or reconstructed version of the version 26 received at the actual addressee 16 and is created by the apparatus 10 based on version 22 received by the passive node 20. For this purpose, the apparatus 10 comprises detecting means 30 and a signal generator 32. In particular, it is the object of the detecting means 30 to detect, in the version 22 received by the passive node 20, deviations of this version from the one that can be received by the actual receiver 16. The signal generator 32 uses or receives these detected deviations and modifies the version 22 to obtain the signal 34 for the analysis of the radio communication system 18, which, in the present case, in particular includes an improved evaluation basis for the subsequent evaluation in means 28, namely a reconstructed version. For generating the improved evaluation basis, the signal generator 32 subjects version 22, for example, to a modification to compensate for the detected deviations and/or to provide the version 22 with additional information relating to the deviations. The improved evaluation basis in signal 34 is passed on to evaluator 28 to perform the evaluation.

The improved evaluation basis 34 as obtained from the apparatus 10 positively influences the evaluation accuracy of the evaluation apparatus 12. If the apparatus 10 were not present, the evaluation means 28 would evaluate the version 22 received at the passive node 20 and would arrive at an evaluation result which would differ from the evaluation result due to the deviations of the version 22 from the version 26 obtainable from the actual receiver node 16 which would result, when the evaluation means 28 were actually able to evaluate the communication based on the version 26. The apparatus 10 now causes the evaluating means 28 to perform the evaluating communication on a reconstructed version or improved evaluation basis modified and/or provided with additional information in relation to the version 22 received at the passive node 20, such that the obtained evaluation is closer to that which would have been obtained from the actually receivable version 26. In the following, embodiments will be described, how detection by the detecting means 10, and the modifications and/or the provision with additional information in the signal generator 32 can be performed to obtain the improved evaluation basis that reduces evaluation result deviations as mentioned above.

Before proceeding with the description of possible details, the following should be mentioned. In particular, it should be noted that although apparatus 10 is shown here in use within apparatus 12, apparatus 10 may also be in use or marketed individually. It should also be mentioned that the signal generated by the apparatus 10 for the analysis of the radio communication system includes an evaluation of the observation position in addition to or as an alternative to the improved evaluation basis or the reconstructed version of the actual receiver signal. The latter information could be used by personnel of the operator of the evaluation apparatus 12 to facilitate the placement of the passive node and/or could be used by the evaluator 28 to provide an evaluation result issued by the apparatus 12 relating to the radio communication system with additional information relating to, for example, a quality of the observation position. Accordingly, all details described below with regard to the generation of the improved evaluation basis on the basis of the detected deviations on the one hand and with regard to the generation of the observation position on the basis of the detected deviations on the other hand are to be considered as transferable or applicable to the present description, both individually and in combination, although it is assumed for the simplification of the following embodiments that the signal 34 includes the evaluation of the observation position only optionally in addition to the improved evaluation basis. As mentioned here, it could also be the other way round—signal 34 could also include merely the evaluation of the observation position.

Figure 5:
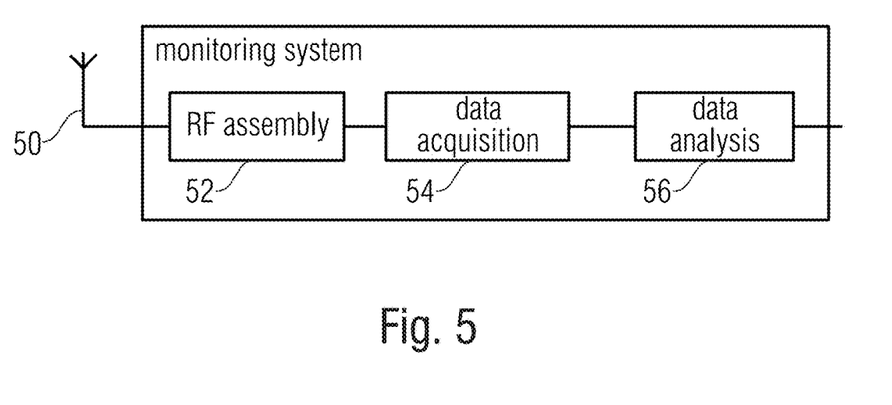
FIG. 5 is a schematic block diagram of the data acquisition and processing of a monitoring system.

In other words, apparatuses 10 and 12 enable the reduction of errors in the resulting evaluation by error detection and data preparation, which would otherwise result due to the detection problems of passive monitoring systems of radio networks. In this context, reference is made again briefly to FIG. 5, which is intended to explain the problem that monitoring systems used for passive observation of radio systems would otherwise have. FIG. 5 shows a comparison monitoring system having an antenna 50 for passively receiving a radio signal, i.e. quasi for receiving a version 22. The monitoring system internally comprises a series connection of the following components: a high-frequency assembly 52 for receiving the analog antenna signal from the antenna 50 and processing or amplifying the same, followed by a data acquisition module 54 in which, for example, digitization can take place, followed again by a data analysis module which performs the actual evaluation, i.e. acts as an evaluation apparatus. The radio frequency band to be analyzed is detected with the help of a monitoring node or several networked monitoring nodes (distributed system). The monitoring system performs an analysis of the measurement data acquired thereby. The data flow within the monitoring system schematically shown in FIG. 5 corresponds to the structure of a typical digital radio receiver. The signal under consideration is received by the antenna 50 and first passes through a series of analog high-frequency assemblies for signal processing, such as an amplifier and/or a filter. This is followed by data acquisition in the data acquisition module 54, where, for example, spectral analysis or radio standard specific demodulation takes place, possibly including digitization of the signal. The acquired data is then subjected to the actual analysis in module 56. However, errors caused by deviations in the receiving position, i.e. by a deviation of the position of the antenna 50 from a corresponding antenna of the actual receiver node, are not taken into account in this information processing chain. The used hardware and software components of FIG. 5 are usually designed for direct use in the communication relationship between transmitter and receiver and do not take into account the specific features of a passive monitoring system. This represents a considerable disadvantage for automated data analysis, since missing or additional information in the data base falsify the results of the following algorithms or deteriorate their statement.

In other words, if the monitoring system shown in FIG. 5 were to be used in FIG. 4 instead of the combination of passive node 20 and apparatus 12, the result would be exactly the negative impact on the evaluation result already described in FIG. 4 due to the deviations of version 22 from version 26 to be actually evaluated.

Figure 6:
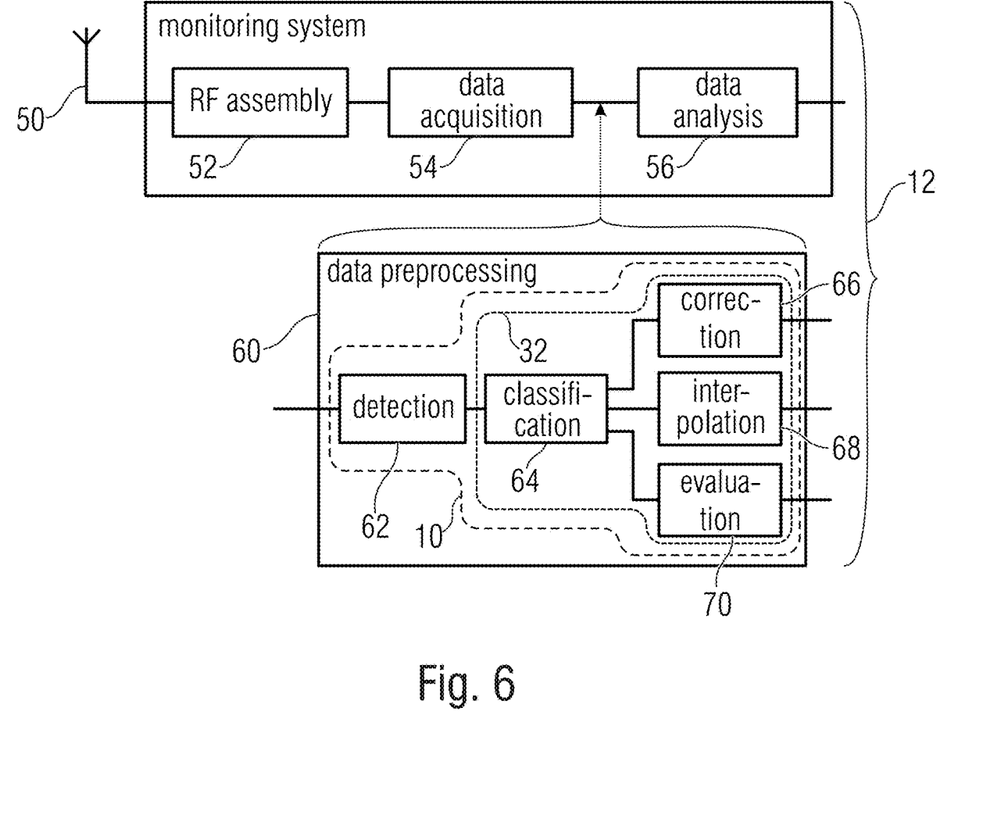
FIG. 6 is a schematic block diagram of the data preprocessing of a monitoring system.

Embodiments of the present application therefore use detection and evaluation of deviations within the acquired measurement data, i.e. within version 22 received at the passive node 20, which arise due to the position of the monitoring system or due to the position deviation of the passive node 20 from the actual receiver node 16. FIG. 6 shows an implementation option with regard to FIG. 4 or a more detailed embodiment of the present application provided by a data preprocessing module as an addition to the monitoring system of FIG. 5 which is connected between the data acquisition module 54 and the data analysis module 56 and is provided with the reference sign 60. The data preprocessing module 60 is an embodiment for the apparatus 10 of FIG. 4, while the data analysis module 56 corresponds to the evaluation apparatus 28 of FIG. 4 or serves as an implementation example for the same. The monitoring system of FIG. 5 is thus an implementation example of the evaluation apparatus 12 of FIG. 4. The data analysis module 56 of FIG. 6 may differ from that of FIG. 5 in its ability to use the additional information possibly generated by the data preprocessing module 60 to draw attention to deviations from the version 26 actually receivable at the receiver node 16.

In the following, details or possible implementation examples for preprocessing in the apparatus 10 and evaluation in evaluation apparatus 12 are described against the background of the embodiment of FIG. 6, in which, as mentioned above, the data preprocessing module 60 functions as preprocessing apparatus 10 and the entire monitoring system as evaluation apparatus 12, but all these details are to be considered also as being directly transferable to the description of FIG. 4.

Before going into the details, it should be noted that, as already mentioned in FIG. 4, the analysis performed by the monitoring system of FIG. 6 could be performed directly on hardware of the passive node, i.e. at the location of the reception of version 22, or beyond it, e.g. on a central server. It should also be noted that the entire evaluation could be performed by the monitoring system or the evaluation apparatus live or in real time or by streaming analysis, or alternatively the analysis could take place offline, e.g. by recording the version 22 and evaluating the same at a later time.

Continuing with the description of FIG. 6, it becomes clear that the integration of the data preprocessing module 60 and its mode of operation into the monitoring system could possibly be performed completely transparently into an existing monitoring system, as shown for example in FIG. 5. However, as mentioned above, it is also possible that the data analysis module 56, which acts as the evaluation means 28, includes information regarding positional reception errors obtained from data preprocessing in its data analysis or evaluation 60 in order to improve the obtained analysis results.

The data preprocessing performed by module 60 may be linked to the previous data acquisition process in module 54, such that it is advantageous to adapt or tailor the data preprocessing steps to the data acquisition process. Depending on the type of acquired data or the type of used radio communication system, there may be differences in the algorithms underlying the data preprocessing in module 60. For example, the measurement values acquired in the spectral analysis can be processed algorithmically differently within an error detection or correction than demodulated packets of a radio protocol. However, the structure of the individual processing steps within the described method remains the same regardless of the data acquisition and the considered radio standard.

Before continuing with the description, reference is made to the internal structure of the data preprocessing module 60 of FIG. 6. The data preprocessing module 60 includes a detecting module 62 that corresponds to the detecting means 30 or serves as an implementation example for the same. In addition, the data preprocessing module 60 of FIG. 6 includes a classifier 64 for classifying detected deviations by said detecting means 62, and a correction module 66 for correcting portions of version 22 received by a passive node 20 received at said passive node 20 but detected as incorrectly received, while having been correctly received in the signal 26 received at the actual receiver node, as well as an interpolation module 68 for inserting portions in the version 22 received at the passive node which have been identified by the detection 62, which are missing in the version 22, although they are contained in the version 26.

In addition, the data preprocessing module 60 of FIG. 6 comprises a module 70 which is intended to give an evaluation to the user of the monitoring system or the evaluation apparatus 12 as to whether the set-up position of the passive node 20 is suitable for the evaluation task or whether any changes to the current monitoring configuration should be made.

The individual tasks of modules 62-70 inside the data preprocessing module 60 are explained in more detail below. As already mentioned, all these details are possible implementation examples for means 30 and 32 or 10 and 12 of FIG. 4. In particular, modules 64, 66, 68 and 70 take over the task of the signal generator 30 of FIG. 4, i.e. they serve as an implementation example for the latter, the modules 64, 66, 68 performing a modification of the signal 22 received at the passive node 22 on the basis of the detected deviations and/or providing the same with additional information relating to the deviations, and module 70 performing position evaluation of the passive node, the above statement with respect to FIG. 4 again being referred to with respect to the possibility that the signal generator 32 merely performs the position evaluation without the evaluation basis generation or vice versa.

In the detecting means 62, the measurement values provided by the data acquisition 54 of the passive node 20 are examined for noticeable patterns which, for example, indicate a position-related deviation corresponding to the observation problem. The characteristic of the measurement data of the passive node 20 in FIG. 4 determines the algorithm of the detecting method of the detecting means 30 in FIG. 4 or 62 in FIG. 6 and specifies whether the detection can be performed per date, for example, or whether, for example, a history of measurement data should be made available. Data acquisition 54 in FIG. 6 can acquire the measurement values in real time in the form of a live system or can make them available as acquired from a database or file.

The next module 64 classifies and marks the deviations detected by the detecting means 10 of FIG. 4 or 62 of FIG. 6. As soon as a deviation is detected, this is marked and thus communicated to subsequent modules, e.g. correction module 66, interpolation module 68, evaluation module 70. In addition to the existence of an anomaly, further information can be inferred from the previous part of the detection 62 or 30 of FIG. 4 of the position-related deviation, which enables classification by the classification module 64. Possible classes can be the type of deviation, e.g. missing or additional packets, frequency, e.g. single deviation or burst, or the cause according to the detection characteristics, e.g. packet collision, attenuation or signal distortion. The "marking" of the deviations from the original measurement data 24 of FIG. 4, transmitted by the first node 14 and the "classifications" according to the type of deviation, are added to the internal communication of the monitoring system and are not subject to any specific requirements.

The following modules, such as correction module 66 and interpolation module 68, can modify the signal 22 received at the passive node 20 based on the classification or marking.

The measurement values detected as defective by the detecting module 62 can be partly, added to the relevant information of the database for the following analyses by a complete or partial correction. With the help of the correction module 66, the effects of the observation problem can be partially compensated. Here, correction does not necessarily refer to all information within a measurement value, but concentrates on the information relevant for subsequent analyses. As with the initial detection of errors, a partial or complete correction often benefits from the consideration of a history of measurement values and achieves a better result. In other words, the correction module 66 can, for example, perform a partial correction on the signal 22 received by the passive node 20 at locations which are marked as defective compared to the version 26 by the classifier 64, where only or primarily only the packet headers are corrected and the payload data take on a secondary role and are possibly left as they are.

The interpolation module 68 offers a further modification option. The interpolation of the measurement values obtained at the passive node 20, which are classified as missing, represents a further way to improve the database. Strong interferences or poor reception conditions between the first node of the radio communication system and the passive node 20 of FIG. 4 may cause messages of the observed link between the first and second nodes of the radio communication system not to be detected and to be lost. The aim is to achieve a representation of the observed link between the first and the second node of the radio communication system that is as true to the original as possible. If a gap within the connection information was detected at the passive node 20, it is possible to determine part of the information needed for the following analyses via the previous course of the measurement values acquired at the passive node 20 of FIG. 4. In contrast to the results of the correction of the correction module 66, the information obtained thereby do not have a fixed point in time, since the same could not be determined due to the unfavorable reception conditions. Instead, a time interval is allocated to the interpolated values. The results of an interpolation of the interpolation module 68 can correspond to specific values, such as the address of the transmitter and receiver of a message, or statistical parameters, such as the minimum, maximum and estimated value of transmitted messages, depending on the number of non-acquired measurement values. In other words, the interpolation module 68 can partially recover the missing measurement values of the signal 22 received at the passive node 20 of FIG. 4 using existing information, such as the number of non-acquired measurement values, address of the transmitter/receiver, partly, such as the packet header.

In addition to the improvement of the database, the evaluation of the observation position is another important component of data preprocessing. The evaluation module 70 provides the user with information on the completeness of the measurement values in relation to the observed data exchange between the first node and the second node 16 of the radio communication system 18. Automated evaluation of the observation position as well as an evaluation of the type of deviation detected within the classification form the basis for necessitated instructions, e.g. a position change, the selection of an antenna with a different directional characteristic or a higher number of monitoring nodes.

It is possible and in some cases also useful, for example with software, to perform the individual process steps of the apparatus 12 in parallel and to integrate a mutual exchange of information. The given sequence is therefore not necessarily to be regarded as rigid and a strong coupling of the individual algorithms can lead to improved performance. Furthermore, it is possible that the specific measurement method and the characteristics of the measurement data of the signal 22 received at the passive node 20 make a correction of the measurement data impossible.

In summary, the additional benefit of the described method consists in minimizing the monitoring nodes 20 of FIG. 4, which are used for passive observation of a radio network 18, To achieve this, the apparatus 12 can detect and compensate for problems (observation problems) occurring due to the external observation position. The described apparatus 12 includes the following points to implement this:

1. The measurement values of the received signal 22 acquired at the passive node 20 are examined for a deviation from a regular communication of two radio nodes 14 and 16 of FIG. 4 with the aid of the detecting module 62 of FIG. 6. This detection of position-related deviations is usually performed based on patterns of spectral data and/or demodulated data or radio packets.
2. The deviations detected by the detecting module 30 or 62 are marked as such by classification module 64 and classified according to their characteristic features. This step enhances the information content and thus supports the compensation of the deviations detected by the detecting module 30 or 62.
3. For compensating the detected deviation, depending on the nature of the problem, one of the following steps will be applied:
    a) the correction module 66 tries to compensate the data received as inconsistent or incorrect.
    b) non-received data and data identified as missing can be reconstructed by interpolation of the interpolation module 68.
4. Based on the deviations detected by the detecting module 30 or 62, supplemented by the results of the correction module 66 and the interpolation of the interpolation module 68, an evaluation of the current observation position of the passive node 20 of FIG. 4 is performed by the evaluation module 70. Here, the effects of the observation position of the passive node 20 are estimated in relation to the further analyses, such as status analyses, cause analyses or link quality analyses, in order to give the user an incentive to act if needed.

In the following, possible details of the above embodiments are explained for the case that the radio communication system 18 is a WLAN network and includes demodulation in the signal reception of the involved nodes and thus also in the passive node. However, the description also applies to other packet-based networks and is therefore transferable to other systems.

In particular, it will now be discussed how the above embodiments can be used in connection with a radio system that uses a specific protocol. Within a protocol analysis, for example, already demodulated radio packets of a receive signal are evaluated. In other words, data preprocessing 60 or 10 receives such already demodulated radio packets. In such a case. WLAN, ZigBee, LoRa, etc. receiver cards can be used for the RF assembly 52 and the data acquisition 54. The following configurations can be used in particular when a WLAN network, e.g. of the type IEEE 802.11, is subjected to observation or evaluation for the radio system 18, wherein these references are only to be understood as examples and can also be transferred to other network protocols.

The already demodulated radio packets of a receive signal 22 are evaluated within a protocol analysis. Passive protocol analysis systems for WLAN consist of at least one WLAN receiver 50 of FIG. 5, which is in "monitoring" or "promiscuous" mode. This enables the passive node 20 designated as WLAN sniffer to receive all WLAN radio packets emitted within the receiving range of the same. This data acquisition of the WLAN sniffer is limited by the set parameters of the WLAN card, e.g. frequency and bandwidth of the transmission channel, and the receiving characteristics of the antenna 50. If the signal-to-noise ratio is too low in the monitoring node 22, e.g. due to strong signal attenuation, a local interferer or device-specific reception problems, transmission errors occur regardless of the comprehensive protective mechanisms of the physical transmission layer. If the packet is not received or is discarded at a very early stage, this can be detected as a deviation based on the sequence of the included sequence numbers. Missing packets that do not use sequence numbers, e.g. ACK, RTS, CTS, etc., can be detected by the detecting means 30 by checking the logical packet sequence, e.g. rule violation of an established grammar or extended state diagrams for a protocol stack. In addition to these more analytical approaches, learning methods also offer a very good option to detect differences in the packet sequence. In addition to classical methods from the field of machine learning, specific approaches from computational linguistics, especially multi-layered neural networks, are particularly well suited. If a disturbed signal 22 is processed by the physical transmission layer and passed on to the MAC layer, these data may still include errors. The test method used for WLAN data transmission is used to detect these bit errors. Here, it is checked whether the checksum included in the packet matches the one calculated for the data received at the passive node 20. The detection of the detecting means 30 by one of the described methods includes additional information to classify the deviation of the packet sequence. The classification is performed by the classification module 64 in the signal generator 32. The number of successive deviations enables, for example, a classification into single packet errors or burst errors or packet sequence errors. Other patterns within the deviations detected by the detecting means 30, such as an asymmetric concentration of missing packets of a communication partner or the second node, may be used for further grouping of the data. In the next step, incorrectly received packets are partially or completely corrected by the correction module 66 of the signal generator 32. The history of the packets received without errors is usually used as a basis for a correction. Techniques such as fuzzy matching, Hidden Markov Models, distance metrics to known information, or checking logical sequences within the used protocols provide a good recovery option for the meta information needed for subsequent analyses. Methods from the fields of machine learning and computational linguistics are also well suited for error correction. Especially specially trained deep neural networks in the instances of long-/short-term memory or transformer-based models allow, for example, a very good prediction of packets that have not been received. Interpolation by the interpolation module 68 in signal generator 32 is obligatory when a packet is discarded or not received. Since no data fragments and also no exact time of reception are available at this point, in contrast to a correction, the information is supplemented by the interpolation module 68 in the signal generator 32 on the basis of the packet history with a greater uncertainty. For longer gaps in reception, the techniques for interpolation are extended by the detection of packet patterns and statistical models. The gaps and characteristic patterns in the sequence numbers, the number of information that cannot be interpolated or corrected, as well as the statistical course of the signal strength can be used to evaluate the current observation position. The evaluation of the current observation position is performed by the evaluation means 70. Position evaluation is particularly important when the correction and interpolation no longer allows any improvement of the database due to reception problems. In this case, the considered links can be marked as not evaluable. A pattern-based cause analysis can provide the user with additional instructions for improving the monitoring system.

It should be noted that differences in the received version at the passive node on the one hand and the observed receiving node on the other hand can also have other reasons than the ones described above. The following examples relate, for example, to deviations of the two versions that might be caused by resource limitations of the analysis system or by the usage of communication modes by the observing communication system that are unknown to the analysis system. The described method for detecting deviations in the data exchange as well as the correction of corresponding deviations also works with regard to the following effects.

1.) Occupied hardware resources in the monitoring system:

Capacity bottlenecks within the hardware, such as occupied bus systems (USB, PCIe, ... ) or a high CPU load, can lead to the loss of correctly received data packets. In the operating system software, these bottlenecks cause data loss due to overflowing buffers. For the analysis system running in the user space, these packet losses do not differ from the interference-induced reception problems already described.

2.) Incompatible transmission modes:

A number of communication standards, such as Wifi and Bluetooth, have been improved and expanded over the years. Even when downward compatibility is usually given, the innovations are usually not supported by older devices. The reason for this is usually the hardware, which no longer meets certain requirements, such as higher-order modulation methods or multi-antenna systems. If an observed 3×3 MIMO-capable WLAN link switches to 3 spatial streams, for example to increase data transmission in the running data exchange, a 2×2 monitoring system cannot receive these data packets. The packet losses caused by such incompatibility can also be detected and partially corrected.

Figure 7:
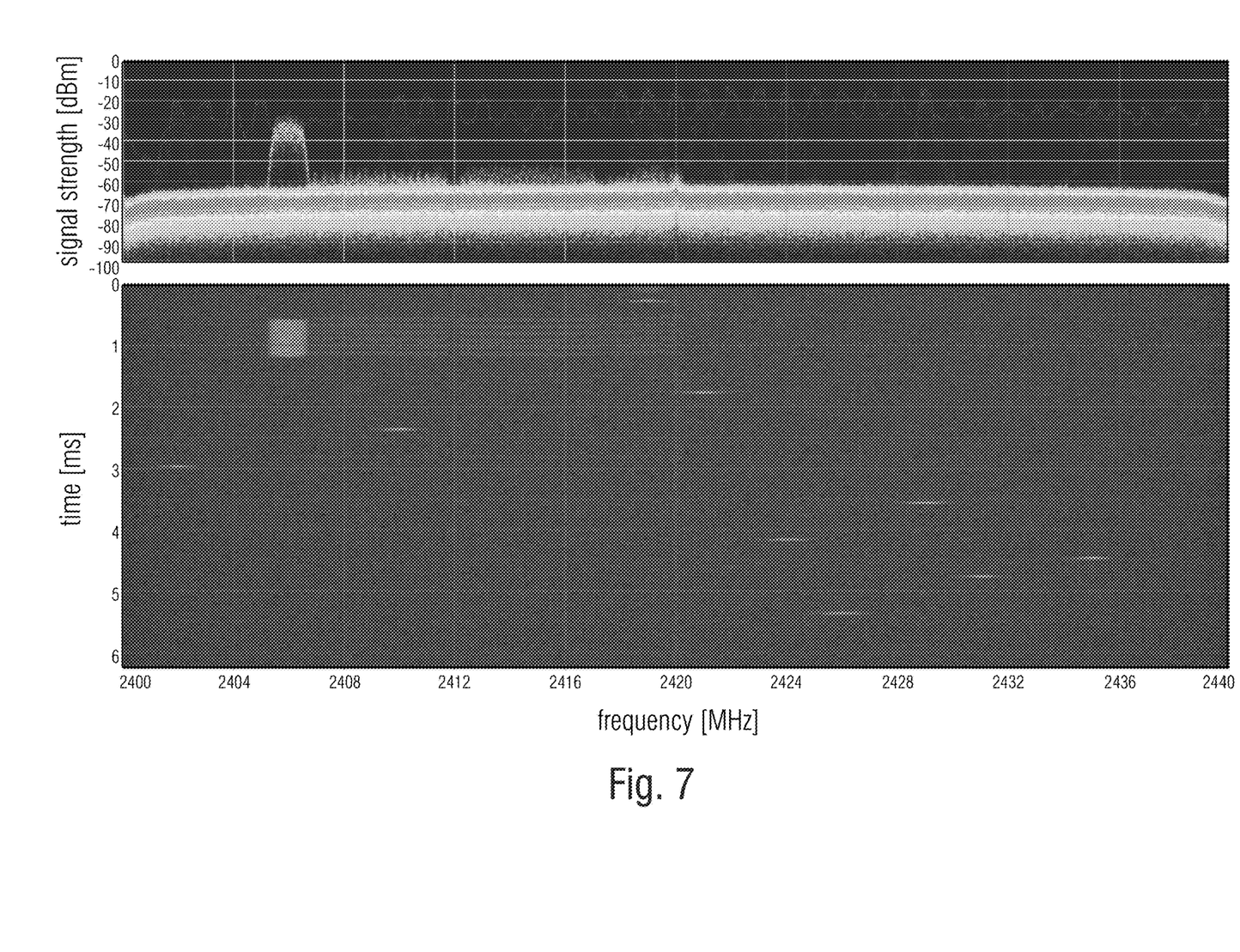
FIG. 7 is a spectrum and spectrogram of a Bluetooth connection.

In the following embodiment, the frequency range of a received signal 22 is analyzed by spectral analysis. With regard to the schematic structure of a monitoring node 20, frequently, real-time capable spectral analyzers based on SDR or "software defined radio" are used for the RF assembly 52 and data processing. The frequency band under consideration is captured by the RF assembly in the time domain and digitized in data processing or data acquisition 54, and transformed into the frequency domain via an FPGA using digital signal processing or data acquisition 54. The result of this transformation represents the energy or amplitude for the respective frequency portion of the signal, as shown in FIG. 7. In order to detect each transmitted data packet, acquisition has to be performed in the time domain with a very high sampling rate. In order to reduce the amount of data generated thereby, the characteristic features of the individual radio systems or nodes of the radio communication system 18 and interference sources are detected via pattern recognition, such as signal shape over bandwidth and duration. Further analyses are thus provided with abstract spectral information, which greatly reduces the hardware requirements of the subsequent processing units. Deviations from the radio standard specific patterns are evaluated as an unknown source of interference by the detecting means 30, Signal deviations also occur due to the passive observation of a radio link between the first and second nodes 14 and 16 of the radio communication system 18. In spectral analysis, the detection of position-related deviations by the detecting means 30 therefore mostly refers to the non-classifiable signals. Radio standard-specific patterns, such as the bandwidth of a signal, can, for example, no longer be correctly allocated due to stronger signal attenuation. i.e. only the peak of the signal protrudes from the noise floor. Even too high an amplification within the RF assembly 52 leads to an overdrive with strong signals and thus to untypical distortions. Using an automatic gain control of the receiving amplifier improves the reception of the powerful signals of adjacent radio nodes, but at the same time suppresses the signals of more distant nodes. The detection of deviations extends the functionality of pattern detection by the identification of attenuation and distortion-specific characteristics. The classification in the classification module 64 of the signal generator 32 uses this information and additionally determines the duration and frequency of the deviations. In addition, with a statistical consideration of the reception strength, a rough allocation of the signals received at the passive node 20 is made according to the number of transmitting nodes in the radio communication system 18. Communication relationships are determined with a certain degree of uncertainty via a long-term observation of the signal sequence and provide the basis for the detection of asymmetric reception conditions. Depending on the type of deviation, a correction is made by the correction module 66 in the signal generator 32 of the signal that cannot be clearly allocated. The influence of signal attenuation or signal distortion is reconstructed by the preprocessing apparatus 10 and the receive signal 22 or the detection patterns are adapted. In addition, a grammar or a state diagram for protocol-specific sequences can be created using the characteristic signal lengths within the history of measurement data. These grammars or state diagrams support the correction of partially received signals and enable interpolation by the interpolation module 68 in the signal generator 32 in case of strong reception disturbances or failures. Evaluation of the current observation position by the evaluation apparatus 70 of the signal generator 32 is performed with the help of the statistical progress of the signal strength and the number of signals that cannot be interpolated or corrected. Using a pattern-based cause analysis, the user can be given instructions on how to improve the monitoring system.

With the embodiments described above, different advantages are possible. Some of these advantages will be discussed separately below.

For example, the above embodiments enable an implementation with an automated detection of position-related deviations. As described above, characteristic patterns of position-related deviations, i.e. deviations of the signal received at the passive node from the version received by the actual receiver node, can be automatically detected within the data acquired at the passive node. They can be marked and classified. The results enable further consideration of the detected deviations in the subsequent analysis, which could possibly also be done manually by the user. Automatic analysis in the subsequent data analysis module has been described above. Overall, it is possible to reduce the number of false statements of such a monitoring system.

In addition, it is possible to improve the database with the above embodiments. If a detected deviation has certain characteristic features, the same can be corrected and interpolated. These processing steps ensure that the information needed for subsequent analyses is not lost. This makes it possible to use a smaller number of monitoring nodes or passive nodes while maintaining the significance of the analysis results. This results in a simple and inexpensive retrofitting capability of passive monitoring systems into an existing radio network.

In addition, the embodiments described above make it possible to create an evaluation of the structure of the monitoring system. In addition to the detection of position-related deviations, for example, in the above embodiments, such as in the evaluation module 70 of FIG. 6, the data acquired by the passive node were also continuously examined with regard to the quality of the observation position, i.e. the position of the passive node. If this optional additional evaluation is provided, this results in an indicator for the significance of the received measurement values or the signal received at the passive node and thus also of the evaluation of the communication derived therefrom. In addition, as described above, cause analysis with regard to the deviations is enabled, which in the case of an unfavorable observation position provides practical instructions for restructuring the monitoring system.

In particular, the above embodiments make it possible to keep the number of monitoring nodes or passive nodes low. Without the advantages provided by the above embodiments, there would also be a risk of over-coverage of the network under observation, where each network node would be observed by several passive nodes. In addition, by embodiments described above, the network to be monitored may be left as it is. Direct integration of monitoring components in each radio node is not needed. Such an integration would also be very costly with the increasing number of network nodes and the effort of filtering out doubly received measurement values would be very expensive.

In addition, with regard to the embodiments described above, it should still be mentioned that the data preprocessing described there as a separate process could also be partially performed in individual components in other blocks of the data flow. For example, the detection of deviations could be performed at least partially in the data acquisition module (see FIG. 6) or, additionally or alternatively, be even integrated at least partially in the hardware of the receiver or passive node.

All in all, the above embodiments can be used for passive monitoring of industrial radio systems, wireless company networks or home networks at the end customer, e.g. in the context of a status analysis or fault diagnosis. With the increased use of license-free frequency bands, the above-mentioned embodiments could provide the basis for frequency management across radio standards.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

The apparatuses described herein can be implemented, for example, by using a hardware apparatus or by using a computer or by using a combination of a hardware apparatus and a computer.

The apparatuses described herein or any components of the apparatuses described herein can be implemented at least partly in hardware and/or software (computer program).

The methods described herein can be implemented, for example, by using a hardware apparatus or by using a computer or by using a combination of a hardware apparatus and a computer.

The methods described herein or any components of the methods described herein can be performed at least partly by hardware and/or by software (computer program).

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for providing an evaluation basis for analyzing a communication link between a first node and a second node of a radio communication system in terms of at least one of quality, stability and reliability by placement of one or more external passive nodes into a transmission reach of the first and second node and performing the analysis exclusively based on a reception at the one or more external passive nodes, the apparatus being configured to perform the analysis based on a first version of a radio signal the radio signal being transmitted from the first node of the radio communication system to the second node of the radio communication system, and the first version being received by the one or more external passive nodes, and the apparatus comprising a detector for estimating deviations of the first version of the radio signal from a second version of the radio signal, the second version being received by the second node; and a generator for generating the evaluation basis based on the deviations;

wherein the generator is configured such that the evaluation basis forms a substitute for the second version for evaluating the communication between the first and the second node, and is configured to acquire the evaluation basis by modifying the first version of the transmitted radio signal based on the deviations and/or providing the same with additional information relating to the deviations, and further comprising a classifier for classifying the deviations to acquire a classification of the deviations, the generator being configured to use the classification of the deviations in the modification and/or the provision.

2. Apparatus according to claim 1, wherein the detector is configured to perform the estimation by spectral analysis to acquire spectral information.

3. Apparatus according to claim 1, wherein the detector is configured to perform the estimation by demodulation to acquire packet contents.

4. Apparatus according to claim 1, wherein the classifier is configured to perform the classification by evaluating portions of the first version that are defective according to a forward error correction of the first version.

5. Apparatus according to claim 1, wherein the classification distinguishes between classes comprising one or more of the following classes:

a packet received in the first version and missing in the second version, a packet received in the second version and missing in the first version, a frequency with which a packet is present in one of the first and second versions but not in the other one of the first and second versions, an allocation to one deviation reason of a number of deviation reasons.

6. Apparatus according to claim 1, wherein the generator is configured to acquire the evaluation basis by modifying the first version of the transmitted radio signal based on the deviations in a manner so as to reduce the deviations of the first version from the second version.

7. Apparatus according to claim 6, wherein the generator is configured to transform, in the modification of the first version, a received packet in the first version, which is indicated to be received errorless in the second version and received erroneously in the first version by the deviations, by means of evaluating packets previously received in an errorless manner in the first version.

8. Apparatus according to claim 1, wherein the generator is configured to acquire the evaluation basis by generating a reconstruction of portions into the first version.

9. Apparatus for generating a signal for an analysis of a radio communication system based on a first version of a radio signal transmitted from a first node of the radio communication system to a second node of the radio communication system received by a passive node, the apparatus comprising detector for detecting deviations of the first version of the transmitted radio signal from a second version of the radio signal received by the second node;

generator for generating the signal based on the deviations, wherein the generator is configured such that the signal comprises an evaluation basis as a substitute for the second version for evaluating a communication between the first and the second node, and is configured to acquire the evaluation basis by modifying the first version of the transmitted radio signal based on the deviations and/or providing the same with additional information relating to the deviations, wherein the generator is configured to insert by interpolation, in the course of the modification of the first version, a reconstructed version of the second portion into the first version as a substitute for second portions of the first version that are missing with respect to the second version according to the deviations, and wherein the generator is configured to generate the reconstructed version of the second portion regardless of a correctness of payload data of the transmitted signal.

10. Apparatus according to claim 9, wherein the generator is configured to temporally perform the insertion at times selected by predetermined rules to compensate for ambiguities in the times.

11. Apparatus according to claim 1, wherein the generator is configured to generate an analysis information on the at least one of quality, stability and reliability based on the evaluation basis.

12. Apparatus according to claim 1 that is configured to provide the evaluation basis for more than one link between nodes of the radio communication.

13. Apparatus according to claim 1 wherein the number of external passive nodes is greater than one.

14. Apparatus according to claim 1, wherein the detector is configured to estimate, a presence of packets of the second version which are missing in the first version and/or a presence of packets in the first version which are missing in the second version by detecting omissions in sequence numbers in a sequence of packets in the first version, and/or by checking the sequence of packets in the first version for a protocol rule violation, and/or by evaluating acknowledgment messages in a radio signal from the second node to the first node.

15. Apparatus for evaluating communication between nodes of a radio communication system, comprising:
an apparatus for generating a signal for an analysis of a radio communication system based on a first version of a radio signal transmitted from a first node of the radio communication system to a second node of the radio communication system received by a passive node in accordance with any one of claims 1-3 and 4-14; and
performer for performing an evaluation of a communication between the first and the second node based on the signal.

16. Apparatus for evaluating communication between nodes of a radio communication system, comprising:
an apparatus for generating a signal for an analysis of a radio communication system based on a first version of a radio signal transmitted from a first node of the radio communication system to a second node of the radio communication system received by a passive node, the apparatus for generating comprising
a detector for detecting deviations of the first version of the transmitted radio signal from a second version of the radio signal received by the second node; and
a generator for generating the signal based on the deviations; and
a performer for performing an evaluation of a communication between the first and the second node based on the signal,
wherein the generator is configured such that the signal comprises an evaluation basis as a substitute for the second version for evaluating a communication between the first and the second node, and is configured to acquire the evaluation basis by modifying the first version of the transmitted radio signal based on the deviations and/or providing the same with additional information relating to the deviations, and
wherein the performer performs the evaluation such that the evaluation is insensitive to at least some deviations of the evaluation basis from the transmitted radio signal relating to payload data in the transmitted radio signal or less sensitive than to deviations relating to packet headers, and
wherein the generator, configured to acquire the evaluation basis by modifying the first version of the transmitted radio signal based on the deviations and/or providing the same with additional information relating to the deviations, is configured to subject, in the course of the modification of the first version, portions beyond the payload data of the first version that have been received incorrectly according to the deviations from the second version, to a correction.

17. Method for generating a signal for an analysis of a communication network based on a first version of a radio signal transmitted from a first node of the radio communications system to a second node of the radio communications system received at an external passive node, comprising
detecting deviations of the first version of the transmitted radio signal from a second version of the radio signal received at the second node;
generating the signal based on the deviations,
by modifying the first version of the transmitted radio signal based on the deviations and/or providing the same with additional information relating to the deviations such that the signal forms an evaluation basis for evaluating the communication network as a substitute for the second version for evaluating the communication network,
wherein the deviations are classified to acquire a classification of the deviations, the classification of the deviations is used in the modification and/or the provision.

18. A non-transitory digital storage medium having a computer program stored thereon to perform the method for generating a signal for an analysis of a communication network based on a first version of a radio signal transmitted from a first node of the radio communications system to a second node of the radio communications system received at an external passive node, the method comprising
detecting deviations of the first version of the transmitted radio signal from a second version of the radio signal received at the second node;
generating the signal based on the deviations,
by modifying the first version of the transmitted radio signal based on the deviations and/or providing the same with additional information relating to the deviations such that the signal forms an evaluation basis for evaluating the communication network as a substitute for the second version for evaluating the communication network,
wherein the deviations are classified to acquire a classification of the deviations, the classification of the deviations is used in the modification and/or the provision when said computer program is run by a computer.

19. Apparatus according to claim 8, wherein the generator is configured to generate the reconstructed version of the second portion regardless of a correctness of payload data of the transmitted signal.

20. Apparatus for generating a signal for an analysis of a radio communication system based on a first version of a radio signal, the radio signal being transmitted from a first node of the radio communication system to a second node of the radio communication system, and the first version being received by an external passive node, the apparatus comprising
detector for detecting deviations of the first version of the transmitted radio signal from a second version of the radio signal, the second version being received by the second node;
generator for generating the signal based on the deviations,
wherein the detector is configured to detect, in the course of the detection, packets missing in the first version compared with the second version and/or packets missing in the second version compared with the first version by detecting omissions in sequence numbers in a sequence of packets in the first version, and/or
by checking the sequence of packets in the first version for a protocol rule violation, and/or
by evaluating acknowledgment messages in a radio signal from the second node to the first node.

21. Apparatus for generating a signal for an analysis of a radio communication system based on a first version of a radio signal, the radio signal being transmitted from a first node of the radio communication system to a second node of the radio communication system, and the first version being received by an external passive node, the apparatus comprising detector for detecting deviations of the first version of the transmitted radio signal from a second version of the radio signal, the second version being received by the second node;
generator for generating the signal based on the deviations,
wherein the detector is configured to detect, in the course of the detection, packets missing in the first version compared with the second version
by detecting omissions of sequence numbers in a sequence of packets in the first version for which there is no re-transmissions in the sequence of packets or
by detecting packets missing in the first version for which an acknowledgment message is contained in a version of a reverse signal sent from the second node to the first node, the version of the reverse signal being received by the external passive node, or
packets missing in the second version compared with the first version
by detecting packets in the first version for which no acknowledgment message is contained in the version of the reverse signal, or
packets missing in the first version compared with the second version and/or packets missing in the second version compared with the first version
by detecting protocol rule violations in a communication represented by the first version and the version of the reverse signal.

22. Apparatus according to claim 2, wherein the detector is configured to perform the estimation by subjecting the spectral information to a neural network.

23. Apparatus according to claim 11, wherein the generator is configured to additionally use the evaluation basis to generate an information on a quality of an observation position of the external passive node.

24. Apparatus according to claim 1,
wherein the detector is configured to determine packets missing in the first version compared with the second version
by detecting omissions of sequence numbers in a sequence of packets in the first version for which there is no re-transmissions in the sequence of packets or
by detecting packets missing in the first version for which an acknowledgment message is contained in a version of a reverse signal sent from the second node to the first node, the version of the reverse signal being received by the external passive node, or
packets missing in the second version compared with the first version
by detecting packets in the first version for which no acknowledgment message is contained in the version of the reverse signal.

25. Apparatus according to claim 1,
wherein the detector is configured to determine
packets missing in the first version compared with the second version and/or packets missing in the second version compared with the first version
by detecting protocol rule violations in a communication represented by the first version and the version of the reverse signal.

26. Apparatus according to claim 16, wherein the detector is configured to perform the detection by spectral analysis to acquire spectral information.

27. Apparatus according to claim 16, wherein the detector is configured to perform the detection by demodulation to acquire packet contents.

28. Apparatus according to claim 16, wherein the detector is configured to perform the detection by demodulation to acquire packet contents.

29. Apparatus according to claim 16, wherein the generator is configured to acquire the evaluation basis by modifying the first version of the transmitted radio signal based on the deviations in a manner so as to reduce the deviations of the first version from the second version.

30. Apparatus according to claim 29, wherein the generator is configured to transform, in the course of the correction, an incorrectly received packet in the first version by means of evaluating packets previously received correctly in the first version.

31. Apparatus according to claim 16, wherein the generator is configured to insert by interpolation, in the course of the modification of the first version, a reconstructed version of the second portion into the first version as a substitute for second portions of the first version that are missing with respect to the second version according to the deviations.

32. Apparatus according to claim 31, wherein the generator is configured to temporally perform the insertion at times selected by predetermined rules to compensate for ambiguities in the times.

33. Apparatus according to claim 16, wherein the generator is configured to determine the evaluation of the observation position of the external passive node based on the deviations.

34. Apparatus according to claim 16 wherein the apparatus for generating is configured to evaluate radio signals from more than one node of the radio communication network.

35. Apparatus according to claim 16 wherein the apparatus for generating is configured to evaluate first versions of the radio signal from more than one passive node.

* * * * *